United States Patent

[11] 3,571,614

[72] Inventor Albert A. Rolstead
Torrance, Calif.
[21] Appl. No. 750,376
[22] Filed Aug. 5, 1968
[45] Patented Mar. 23, 1971
[73] Assignee Hughes Aircraft Company
Culver City, Calif.

[54] TRANSISTOR SWITCH WITH MINIMIZED TRANSITION POWER ABSORPTION

4 Claims, 2 Drawing Figs.

[52] U.S. Cl. 307/202, 307/253
[51] Int. Cl. H02h 7/20, H03k 17/00
[50] Field of Search 307/202, 246, 270, 314

[56] References Cited
UNITED STATES PATENTS

| | | | |
|---|---|---|---|
| 3,293,495 | 12/1966 | Smith | 307/202X |
| 3,305,707 | 2/1967 | Wehman | 307/270 |

*Primary Examiner*—Donald D. Forrer
*Assistant Examiner*—B.P. Daxis
*Attorneys*—James K. Haskell and Allen A. Dicke, Jr.

ABSTRACT: A transistor switch, an inductor and the load are serially connected so that during turn-on transition of the transistor, the inductor holds back current flow until the transistor is saturated. A capacitor paralleled around the transistor charges during turnoff transition so that current through the transistor during transition is minimized to minimize power absorption therein.

INVENTOR.
ALBERT A. ROLSTEAD,
BY
Allen A. Dicke, Jr.,
AGENT

TRANSISTOR SWITCH WITH MINIMIZED TRANSITION POWER ABSORPTION

The Invention herein described was made in the course of or under a contract or subcontract thereunder, with the U.S. Air Force, Department of Defense.

BACKGROUND

This invention is directed to an electric circuit which includes a transistor switch, which circuit minimizes power absorption in the transistor during transition.

THe prior art includes quite a number of circuits in which transistors are used for switching devices, and in these prior art circuits the transistor must be sized with respect to its circuit in such a way that the power absorbed in the transistor during transition must not be so high that it is destructive to the transistor switch. The voltage drop during saturated conduction causes power absorption in the switch, the product of the voltage drop times the current. However, when switching occurs, the voltage within the transistor is higher, up to the value of the source of voltage, neglecting transients. Thus, a considerable amount of power can be absorbed during the transition, either to the on or off condition. When switching rates are repetitive at fairly high rates, the amount of power absorbed during switching may be the controlling factor when evaluating transistor heat loading. It often occurs that the switching rate becomes the controlling factor, and it was necessary to limit the switching repetition rate to the same level or to employ parallel transistors. The advantages of higher switching rates include the use of smaller and lighter reactive elements. It makes radio frequency interference filtering more easily accomplished. Higher switching rates make it possible to increase the bandwidth of servosystems where formerly the carrier frequency had been limited by the switching repetition rate.

SUMMARY

In order to aid in the understanding of this invention, it can be stated in essentially summary form that it is directed to a transistor switch with circuitry which minimizes transition power absorption. The circuitry for minimizing on-switching power absorption comprises a series inductor to maintain current at a low value until the transistor is saturated. The circuit for minimizing off-switching power absorption comprises a capacitor paralleled around the transistor so that the current is diverted from transistor into the capacitor during the transition to minimize power absorption in the transistor.

Accordingly, it is an object of this invention to provide a transistor switch which has associated circuitry which minimizes transition power absorption in the transistor switch. It is another object of this invention to provide for minimized transition power absorption in a transistor switch to permit higher switch repetition rate than would otherwise be tolerable, when the prior rate was limited by transition power absorption. It is another object of this invention to provide a circuit which minimizes current flow in the transistor during the on and off switch transition time. Other objects and advantages of this invention will become apparent from a study of the following portion of the specification, the claims and the attached drawings.

DESCRIPTION

Figure 1:
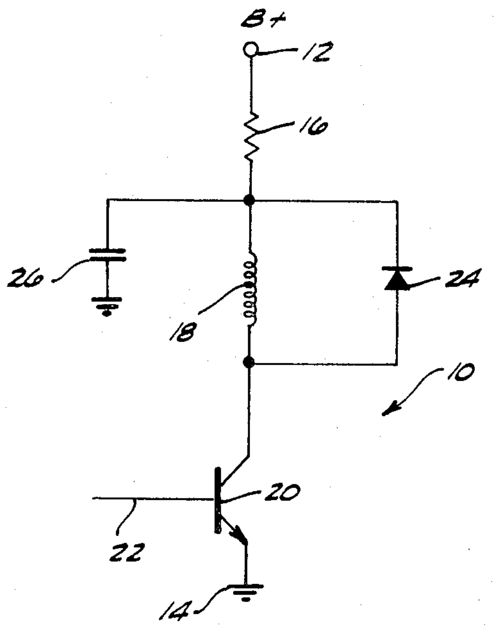
FIG. 1 is an electrical schematic drawing showing the transistor switch with minimized transition power absorption circuitry of this invention in a simpler embodiment.

In FIG. 1, the transistor switch with a circuit for minimized transition power absorption in the transistor switch is generally indicated at 10. Serially connected across a voltage difference between source of power 12 and ground 14 are load 16, inductor 18 and transistor switch 20. Transistor switch 20 has its base circuit 22 connected so that transistor 20 can be changed between its low and high impedance states. Paralleled around inductor 18 is diode 24 and paralleled around the series combination of inductor 18 and transistor switch 20 is capacitor 26.

Assuming that the transistor switch 20 is in its high impedance state, its base circuit 22 drives the switch into saturation in order to turn on the circuit. Just before the turnon, the entire B+ voltage was held off by switch 20. During on transition, the voltage appears across load 16, inductor 18 and switch 20, the division depending on the state of switch 20 and the current. Once switch 20 has been fully turned on, the voltage drop appears across the serial combination of load resistance 16 and inductor 20. Inductor 20 holds the current at a very low value during the switch on transition, and since current flow is thus low, the power absorbed during the turnon transition is low. After steady state is reached, the entire B+ voltage of the power supply appears across load resistance 16, except for the fairly low, in the neighborhood of 1 volt of below, voltage drop collector to emitter of transistor switch 20. Thus, under these circumstances, the voltage on capacitor 26 is very low, equal to the voltage drop in the switch 20.

Now, when the base drive circuit 22 drives transistor switch 20 toward the high impedance state, the voltage rises at the collector of transistor switch 20. When this rise is sufficient to forward bias diode 24, the collector of transistor 20 is clamped at a voltage determined by the charge on capacitor 26. Since this capacitor was substantially uncharged, the voltage rise time for a particular circuit can be controlled by capacitor size. The energy in inductor 18 is dissipated in diode 24, and the current in load resistance 16 goes to charge capacitor 26.

The values of the components in an illustrative circuit are as follows:

| | Item | Value or Identification |
|---|---|---|
| Reference No.: | | |
| 12 | Power Supply | 300 v. |
| 16 | Resistor | 20 ohms. |
| 18 | Inductor | 40 microhenrys. |
| 20 | Transistor | TI (SP4804). |
| 24 | Diode | IN3913. |
| 26 | Capacitor | .2 microfarads. |

With these components, during the switching of transistor switch 20 from the high to low impedance state, and from the low to the high impedance state, only a minimum of power is absorbed therein. The circuit in that configuration can satisfactorily switch 300 volts and 15 amperes. .In those cases where the current is beyond the present state of the art for a single semiconductor device, the present circuitry permits a convenient way to parallel a few transistors. However, the number of transistors would be the number dictated by the current handling capability, and not by the power dissipation during transition.

Figure 2:
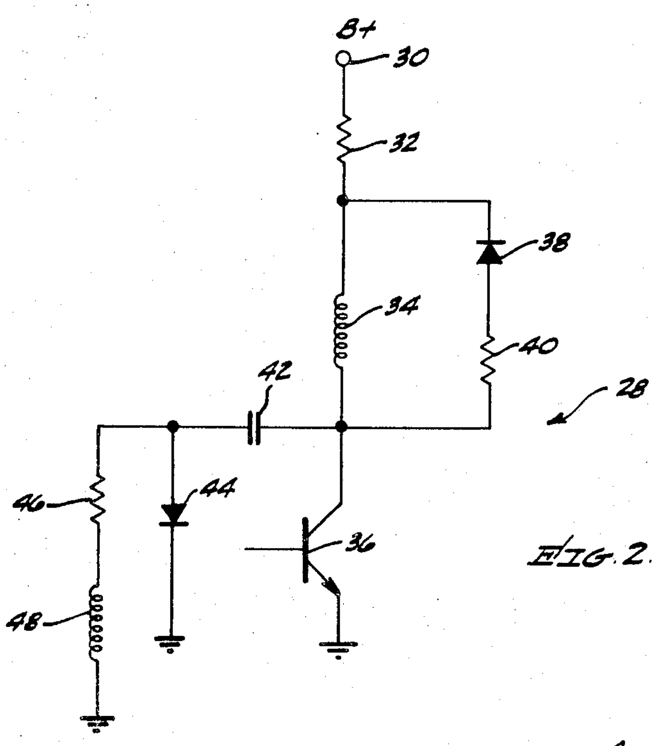
FIG. 2 is a similar drawing showing an additional and preferred embodiment thereof.

Referring to the preferred embodiment shown in FIG. 2, the transistor switch and its circuit for minimizing power absorption therein during switching is generally indicated at 28. Again, serially connected to a positive source of power 30 is load resistance 32, inductor 34 and transistor switch 36, which is in turn connected to the ground which serves as the other side of the source of power. Paralleled around inductor 34 is diode 38, which is identical in function to diode 24 in circuit 10. However, diode 38 has a resistor 40 in series therewith for faster discharge of inductor 34, to dissipate the energy stored in inductor 34 in resistor 40 when switch 36 is in the high-impedance state.

Additionally, capacitor 42 is paralleled around switch 36. However, in circuit 28 diode 44 is serially connected to the capacitor in such direction as to permit normal current flow from capacitor to ground. Additionally, connected between capacitor 42 and diode 44 is a series combination of resistor 46 and inductor 48 which has its other end connected to ground. This arrangement of diode 44, resistor 46 and inductor 48 is such that the diode permits capacitor 42 to be charged in the same manner as before. However, upon discharge the discharge current is forced to flow through resistor 46 and inductor 48. This limits the peak discharge current in transistor 36, but of course increases the time to discharge capacitor 42, thus limiting the ultimate switching frequency.

In operation, it can be seen when transistor switch is in its high impedance condition, no current flows through load 32, so no energy is stored in inductor 34, but capacitor 42 is fully charged. Now, when transistor switch 36 is driven into its saturated condition, inductor 34 limits current flow to a predetermined rate of change until after transistor switch 36 is fully turned on. Thus, current is low while the voltage drop across transistor 36 changes from its high to a low value. Accordingly little power is dissipated in transistor 36 during such operation. Now energy is stored in inductor 34, but capacitor 42 is discharged through resistance 46 and inductor 48. It must be fully discharged before off-switching of transistor 36 is attempted, to get full advantage of the circuit.

Upon off-switching of transistor 36, the collector voltage of transistor 36 rises to the forward bias voltage of diode 44, thus clamping the transistor collector voltage at the voltage on capacitor 42, plus the voltage drop across diode 44. The energy in inductor 34 is absorbed in resistor 40. The current through load resistance 32 charges capacitor 42. During this charging, the capacitor current goes through diode 44.

Values for an exemplary circuit are given below:

| | Item | Value or Identification |
|---|---|---|
| Reference No.: | | |
| 30 | Power Supply | 300 v. |
| 32 | Load Resistor | 20 ohms. |
| 34 | Inductor | 8 microhenrys. |
| 36 | Transistor Switch | SP4804 (TI). |
| 38 | Diode | IN4257. |
| 40 | Resistor | 2 ohms. |
| 42 | Capacitor | .047 microfarads. |
| 44 | Diode | IN4257. |
| 46 | Resistor | 300 ohms. |
| 48 | Inductor | 2 millihenrys. |

With the above values, the switching circuit 28 operated at 25 kc., 15 a. and 300 v., the frequency was not limited by the transition switching heating in the switching transistor, as would have been the case without the heating limiting circuit of this invention.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

I claim:

1. A transistor switch circuit with minimized transition power absorption, said transistor switch circuit comprising:
   a serially connected transistor switch and inductor serially connectable with a load and with a source of direct current so that switching said transistor switch between its high and low impedance states controls the flow of current through the load;
   a first diode paralleled around said inductor, said first diode being arranged with its high impedance flow direction being parallel to the current flow through said inductor when the transistor is in its low impedance state;
   a serially connected capacitor and second diode connected in parallel to said transistor switch so that, when said transistor switch is changed from its high impedance state to its low impedance, saturated state, said inductor minimizes transistor current flow until said transistor is saturated and so that, when said transistor is changed from its low impedance state to its high impedance state, said capacitor and second diode divert the current from the transistor until said transistor reaches its high impedance state and the energy in said inductor is transmitted through said first diode so that transition power absorption is minimized in said transistor switch.

2. The transistor switch circuit of claim 1 wherein a second resistor and second inductor are serially connected in parallel to said second diode to limit the discharge rate of said capacitor.

3. A transistor switch circuit with minimized transition power absorption, said transistor switch circuit comprising:
   a serially connected transistor switch and inductor serially connectable with a load and with a source of direct current so that switching said transistor switch between its high and its low impedance states controls the flow of current through the load;
   a serially connected first diode and resistor paralleled around said inductor, said first diode being arranged with its high impedance flow direction being parallel to the current flow through said inductor when the transistor is in its low impedance state so that the resistor absorbs energy from the current through said first diode induced by said inductor when said transistor switch is changed to its high impedance state;
   a serially connected capacitor and second diode connected in parallel to said transistor switch so that, when said transistor switch is changed from its high impedance state to its low impedance, saturated state, said inductor minimizes transistor current flow until said transistor is saturated and so that, when said transistor is changed from its low impedance state to its high impedance state, said capacitor and second diode divert the current from the transistor until said transistor reaches its high impedance state and the energy in said inductor is transmitted through said first diode so that transition power absorption is minimized in said transistor switch.

4. The transistor switch circuit of claim 3 wherein a second resistor and second inductor are serially connected in parallel to said second diode to limit the discharge rate of said capacitor.